July 23, 1968 G. A. DOTTO 3,394,296
SYNCHRONOUS MOTOR STATOR CIRCUIT EMPLOYING
COMMUTATOR AND RECTIFIER DURING STARTING
Filed May 31, 1966 2 Sheets-Sheet 1

INVENTOR
GIANNI A. DOTTO
BY
Robert Levine
ATTORNEY

July 23, 1968 G. A. DOTTO 3,394,296
SYNCHRONOUS MOTOR STATOR CIRCUIT EMPLOYING
COMMUTATOR AND RECTIFIER DURING STARTING
Filed May 31, 1966 2 Sheets-Sheet 2

INVENTOR
GIANNI A. DOTTO
BY
*Robert Levine*
ATTORNEY

United States Patent Office 3,394,296
Patented July 23, 1968

3,394,296
SYNCHRONOUS MOTOR STATOR CIRCUIT
EMPLOYING COMMUTATOR AND RECTI-
FIER DURING STARTING
Gianni A. Dotto, Dayton, Ohio, assignor to P. R. Mallory & Co. Inc., Indianapolis, Ind., a corporation of Delaware
Filed May 31, 1966, Ser. No. 553,916
21 Claims. (Cl. 318—138)

The present invention relates to improvements in motors and more particularly to the means and methods for providing a motor having a commutator means for controlling the direction of current flow through the field coil, thereby obtaining improved starting characteristics. The commutator means may include a variable timing circuit means for varying the synchronous speed of the motor without appreciably decreasing the torque output. The motor of the present invention may also include a means for connecting the field coil directly across an alternating current power source when the rotor reaches a predetermined synchronous speed, thereby bypassing the commutator means.

The motor of the present invention is distinguishable over the prior art because of the commutator means which controls the direction of current flow through the field coil. By controlling the direction of current flow through the field coil, improved starting characteristics are obtained. Specifically, when the motor of the present invention is started with a load on the shaft, current can only flow in one direction through the field coil until the rotor has rotated a predetermined amount. Then current can only flow in the opposite direction through the field coil until the rotor has rotated a predetermined amount further. Contemporary motors, to the contrary, have full-wave alternating current applied to the field coil from the start. Thus, in contemporary motors, there is an instantaneous magnetic field tending to move the rotor in one direction and, if the motor does not move a sufficient distance against the load, there is a following instantaneous magnetic field tending to move the rotor in the opposite direction.

According to the present invention a commutator means comprising first, second and third brushes, a rotating commutator element, and first and second unidirectional semiconductor devices is adapted to a motor so as to control the direction of the current flow through the field coil.

The rotating commutator element is a means for alternately connecting the first and second brushes to the third brush as the rotor rotates. The anode of the first unidirectional semiconductor device is connected to the first brush and the cathode of the first unidirectional semiconductor device is connected to a first side of the field coil. The cathode of the second unidirectional semiconductor device is connected to the second brush and the anode of the second unidirectional semiconductor device is connected to the first side of the field coil. The second side of the field coil is connected to one side of the alternating current power source and the third brush is connected to the opposite side of the alternating current powers source. Therefore, the connection between the first and second brushes and the third brush and the blocking action of the first and second unidirectional semiconductor devices will determine the direction of current flow through the field coil.

In one embodiment of the present invention, the aforementioned unidirectional semiconductor devices may be simple junction diodes. In another embodiment, the aforementioned unidirectional semiconductor devices may be electronic switches, commonly referred to as silicon controlled rectifiers. Silicon controlled rectifiers have gate electrodes in addition to the anode and cathode electrodes. The gate electrode is a means for controlling current flow from the anode electrode to the cathode electrode. By connecting a variable timing circuit means in circuit with the silicon controlled rectifiers, the flow of current through the field coil can be controlled so as to vary the synchronous speed of the motor without appreciably decreasing the output torque. Specific means and methods for providing a variable speed synchronous motor will be discussed later in this specification. The present invention is not, however, limited to synchronous motors.

The motor of the present invention may be a unidirectional shaded pole motor for providing better running torque characteristics as well as a non-shaded pole motor. A shaded pole motor is illustrated and discussed in this specification. In the illustrative embodiment, the housing for the motor is a cylindrically shaped enclosure having substantially flat ends. The stator poles are struck out of the flat ends to form a circle for enclosing the rotor. The field coil of the motor is annularly disposed in the space between the stator poles and the outside walls of the housing.

It is an object of the present invention, therefore, to provide an improved motor.

It is another object of the present invention to provide a motor having a novel commutator means for providing improved starting characteristics.

It is another object of the present invention to provide a motor having a novel commutator means for controlling the direction of current flow through the field coil.

It is a further object of the present invention to provide a novel commutator means for varying the synchronous speed of the motor.

It is yet another object of the present invention to provide a commutator means for varying the synchronous of current through the field coil of a motor so as to vary the synchronous speed of said motor.

It is still another object of the present invention to provide a commutator means for varying the synchronous speed of a motor without appreciably reducing the torque output.

It is still another object of the present invention to provide a motor having a commutator means for controlling the direction of current flow through the field coil of said motor and a means for connecting the field coil directly across the alternating current power source when the motor reaches a predetermined synchronous speed.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is a motor of the type having a permanent magnet rotor, stator poles circumscribing said rotor, a field coil for establishing the polarity of said stator poles, and a commutator means for controlling the direction of current flow through the field coil. The commutator means may include variable timing circuit means for varying the synchronous speed of the motor of the present invention without appreciably decreasing the torque output. For instance, with such a commutator means, the motor of the present invention has approximately 95% of the torque at 500 r.p.m. as it does at 1200 r.p.m. The variable timing circuit means includes means for rendering first and second unidirectional semiconductor devices conductive at a predetermined periodicity. As an optional feature, the motor of the present invention may be provided with means for connecting the field coil directly across the alternating current power source when the rotor reaches a predetermined synchronous speed.

Figures 1, 2:
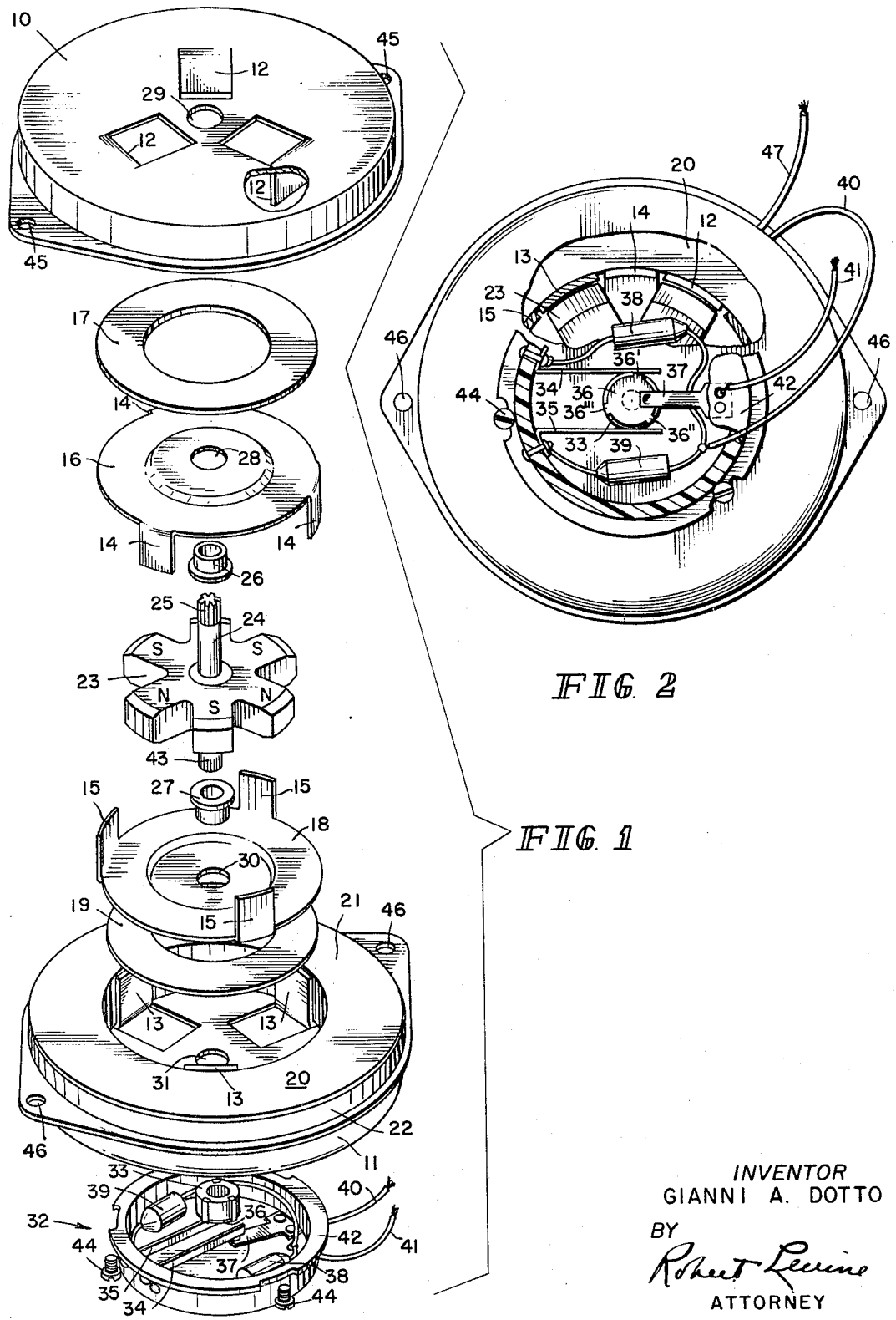
FIGURE 1 is an exploded perspective view of the motor of the present invention.
FIGURE 2 is an elevation view of the motor of the present invention illustrating the arrangement of the commutator means.

Referring now to the drawing, and particularly to the exploded perspective of FIGURE 1, the component parts and structure of the present invention can be visualized in conjunction with the following description.

There is a cold-rolled steel cylindrically shaped housing consisting of the top cover 10 and bottom cover 11. There are integrally formed stator poles 12 struck out of the substantially flat end of the top cover 10 and integrally formed stator poles 13 struck out of the substantially flat end of the bottom cover 11. The stator poles 12 and 13 are equally and radially spaced. The stator poles 12 extend toward the bottom cover 11 and the stator poles 13 extend toward the top cover 10.

In the illustrative embodiment of FIGURE 1, there are shaded stator poles 14 spot welded or otherwise attached to the top cover 10 and shaded stator poles 15 spot welded to the bottom cover 11. The shaded stator poles 14, which are also equally and radially spaced, are integrally formed on a circular cold-rolled steel member 16 which is concentrically attached to the top cover 10. There is a copper shading ring 17 concentrically disposed between the member 16 and the top cover 10. The shaded stator poles 15, which are also equally and radially spaced, are integrally formed on a circular cold-rolled steel member 18 which is concentrically attached to the bottom cover 11. There is a copper ring 19 concentrically disposed between the member 18 and the bottom cover 11.

When the covers 10 and 11 are held together, the stator poles 12 and 13 and the shaded stator poles 14 and 15 are all intermeshed so as to provide a circle of alternating stator poles 12 and 13 and shaded stator poles 14 and 15. Specifically, there will be a shaded stator pole 15, a stator pole 13, a shaded stator pole 14, a stator pole 12, a shaded stator pole 15, etc.

The motor of the present invention does not have to have shaded stator poles. The shaded stator poles are merely and optional feature for obtaining a unidirectional rotation and to provide improved starting and running torque characteristics. Therefore, all of the stator poles can be struck out of the covers 10 and 11 in the same way that stator poles 12 and 13 are formed. In that case, the copper shading rings 17 and 19 will not be necessary.

A spool wound field coil 20 is annularly disposed in the space between the circle formed by the stator poles 12 and 13 and the shaded stator poles 14 and 15 and the outside walls of the covers 10 and 11. The field coil 20 is fabricated by winding a predetermined number of turns of wire on an insulated spool 21. There is an insulating tape 20 wound around the spool 21 to protect the wire.

There is a permanent magnet rotor 23 mounted on a shaft 24 having an integrally formed pinion gear 25 thereon. The pinion gear 25 is a means for coupling the shaft 24 to an element driven by the motor. In the illustrative embodiment of FIGURE 1, the rotor 23 is a member having six equally and radially spaced appendages permanently magnetized alternately north and south. It is to be pointed out that a rotor 23 having any number of permanent magnet pole pairs can be used in the motor of the present invention.

The shaft 24 is rotatably supported in a pair of bearings 26 and 27. The bearing 26 is mounted in the center hole 28 in the member 16 and the center hole 29 in the top cover 10. The bearing 27 is mounted in the center hole 30 in the member 18 and the center hole 31 in the bottom cover 11.

There is a commutator means 32 mounted on the bottom cover 11 as illustrated in FIGURE 1. The commutator means 32 is comprised of the rotating commutator element 33, a pair of brushes 34 and 35 for alternately contacting a common conducting surface 36 on the rotatting commutator element 33, a brush 37 for constantly contacting the common conducting surface 36, a pair of unidirectional semiconducttive devices 38 and 39, hereinafter referred to as diodes 38 and 39, a pair of lead wires 40 and 41, and a housing 42. The rotating commutator element 33 is mounted on the knurled end 43 of the shaft 24 so as to be rotated thereby. The brushes 34 and 35 are mounted on the side wall of the housing 42 and spring loaded to press against the rotating commutator element 33. The brush 37 is mounted on the bottom surface of the housing 42 and is spring loaded to press up against the common conducting surface 36 of the rotating commutator element. The configuration of the common conducting surface 36 will be more clearly described in conjunction with FIGURES 2 and 3. Also, the interconnections between ths brushes 34, 35 and 36 and the diodes 38 and 39 will be described in conjunction with FIGURE 3.

There are three screws 44 for holding the housing 42 to the bottom cover 11.

The top cover 10 has a pair of mounting holes 45 and the bottom cover 11 has a pair of mounting holes 46. The mounting holes 45 and 46 are aligned so as to facilitate holding the top cover 10 to the bottom cover 11.

Referring now to FIGURE 2, a view illustrating the operation and structure of the commutator means 32 can be discussed.

As stated previously, the rotating commutator element 33 has a common conducting surface 36 thereon. The common conducting surface 36 has three equally and radially spaced integrally formed contacting surfaces 36', 36" and 36''' extending therefrom in an axial direction. There is an insulating area between each of the contacting surfaces 36', 36" and 36'''. Since the contacting surfaces 36', 36" and 36''' are 120° apart and the brushes 34 and 35 are 180° apart, rotation of the rotating commutator element will alternately contact the brushes 34 and 35 to the common conducting surface 36.

The brush 35 is connected to the cathode of the diode 39. The brush 34 is connected to the anode of the diode 38. The cathode of the diode 38 is connected to the anode of the diode 39. The lead wire 40 is connected from a common point between the cathode of the diode 38 and the anode of the diode 39 to a first side of the field coil 20. The lead wire 41 is connected to the brush 37. A lead wire 47 is connected to a second side of the field coil 20. (In FIGURE 2, the pointed ends of the diodes 38 and 39 are the cathodes.)

Figure 3:
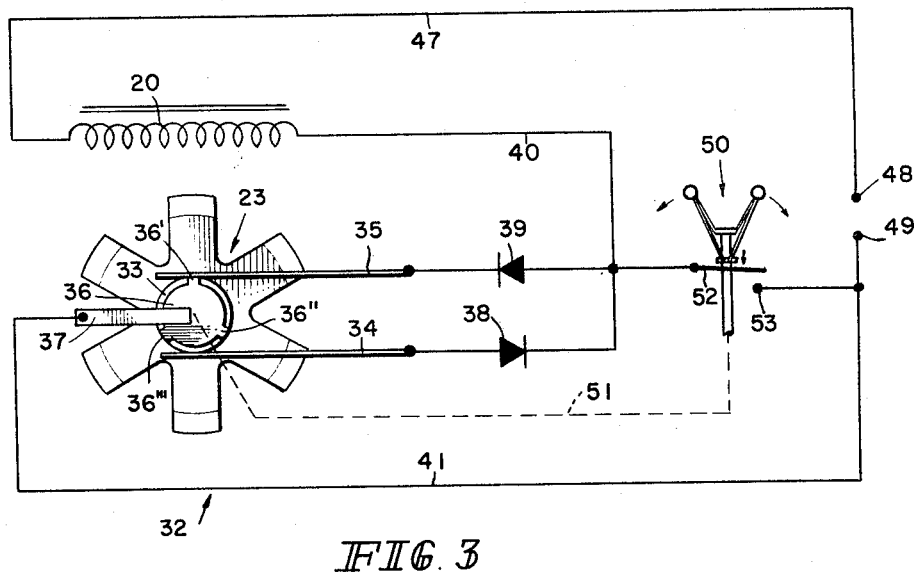
FIGURE 3 is a circuit diagram of the field coil and commutator means of the present invention.

Referring now to FIGURE 3, a schematic showing the operation of the commutator means 32 may be discussed.

Alternating current is applied across a pair of terminals 48 and 49. The terminal 48 is connected to the lead wire 47 and the terminal 49 is connected to the lead wire 41.

With the brush 35 in contact with the contacting surface 36', only half-wave positive current can flow from the terminal 48 through the field coil 20, diode 39, brush 35 and brush 37 to the terminal 49. The negative current flow is blocked by the diode 39. Therefore, until the rotor 23 rotates through an angle which will make contact between either the contacting surface 36″ or the contacting surface 36‴ and the brush 34, only positive current can flow through the field coil 20. The number of cycles necessary to obtain such an angular movement is dependent on the torque load on the rotor 23 shaft.

When the contacting surface 36‴ is in contact with the brush 34, positive current can flow from the terminal 49 through the brush 37, brush 34, diode 38 and field coil 20 to the terminal 48.

From the foregoing discussion, it can be seen that the commutator means 32 provides half-wave direct current to the field coil 20 when the brushes 34 and 35 are alternately connected to the common conducting surface 36 and, consequently, to the brush 37. When to rotor 23 reaches synchronous speed, the rotating commutator element 33 will be rotating at a speed which will alternately connect the brushes 34 and 35 to the common conducting surface 36 so as to provide full wave alternating current to the field coil 20. The commutator means, therefore, controls the direction of current flow through the field coil.

An optional feature for the motor of the present invention is a means for connecting the field coil 20 directly to the terminals 48 and 49 when the rotor 23 reaches a predetermined synchronous speed. The illustrated means for connecting the field coil 20 directly to the terminals 48 and 49 is a centrifugal switch 50 which is operated by a linkage 51 connected to the rotor 23. It can be seen that actuation of the centrifugal switch 50 will electrically connect a pair of contacts 52 and 53, thereby connecting the field coil 20 directly to the terminals 48 and 49.

If shaded stator poles are not used to provide unidirectional rotation for the rotor 23, the direction may be determined by defining a starting position for the rotor 23 which will permit current to flow in only one direction through the field coil 20.

Figure 4:
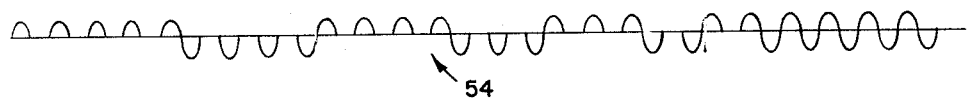
FIGURE 4 is a waveform diagram showing a typical starting condition for the motor of the present invention.

Referring now to FIGURE 4, a waveform diagram illustrating a typical starting condition for the rotor of the present invention can be discussed.

The waveform 54 represents the rectified alternating current applied to the field coil by the commutator means 32. It can be seen that when current is first applied to the motor, five positive half-cycles of current are required to rotate the rotor 23 so that current can flow through the field coil 20 in the opposite direction. After the first five positive half-cycles, four negative half-cycles, four positive half-cycles, three negative half-cycles, three positive half-cycles, two negative half-cycles, and two positive half-cycles are required before the rotor reaches synchronous speed. As stated previously, the time required to get the rotor up to synchronous speed depends on the torque load on the rotor 23 output shaft. It can be seen that full-wave current is applied to the field coil 20 when the rotor 23 reaches synchronous speed.

Figure 5:
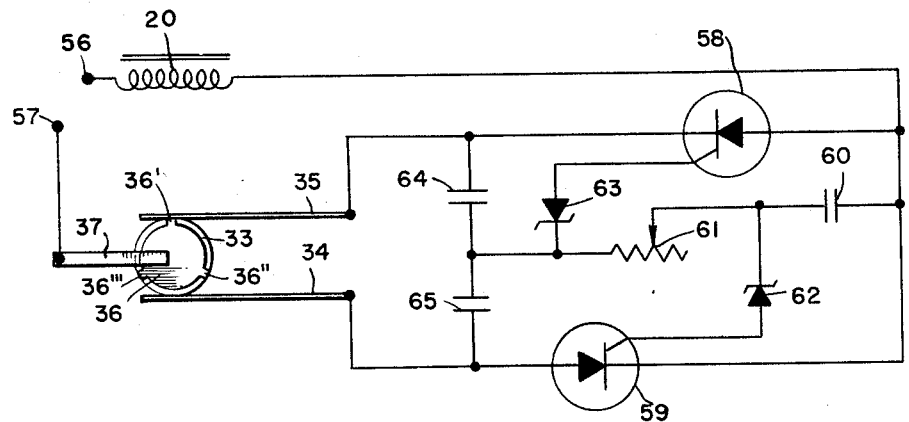
FIGURE 5 is a schematic of a control circuit for varying the synchronous speed of the motor of the present invention.

Referring now to FIGURE 5, a schematic of a control circuit for varying the synchronous speed of the motor of the present invention can be discussed.

The alternating current input to the control circuit is applied across the terminals 56 and 57. The terminal 57 is connected to the brush 37. The terminal 56 is connected to the field coil 20 and through the field coil 20 to the anode of a unidirectional semiconductor device 58, hereinafter referred to as the silicon controlled rectifier 58, and the cathode of a unidirectional semiconductor device 59, hereinafter referred to as the silicon controlled rectifier 59. A capacitor 60 is connected from a common point between the anode of the silicon controlled rectifier 58 and the cathode of the silicon controlled rectifier 59 to a first side of an adjustable resistor 61 and a cathode of an avalanche device 62. The anode of the avalanche device 62 is connected to the gate of the silicon controlled rectifier 59. The cathode of the silicon controlled rectifier 58 is connected to the brush 35 and to a first side of a capacitor 64. The second side of the capacitor 64 is connected to a first side of a capacitor 65 and to a cathode of an avalanche device 63. The anode of the avalanche device 63 is connected to the gate of the silicon controlled rectifier 58. The second side of the capacitor 65 is connected to the brush 34 and the anode of the silicon controlled rectifier 59. The cathode of the avalanche device 63 is connected to a second side of the adjustable resistor 61.

The operation of the control circuit illustrated in FIGURE 5 is as follows: When terminal 56 goes positive with respect to terminal 57, a positive current flows through the field coil 20, capacitor 60, and adjustable resistor 61 to charge the capacitor 64 to the breakdown voltage of the avalanche device 63. When the avalanche device 63 breaks down and turns on the silicon controlled rectifier 58, current can flow through the silicon controlled rectifier 58, brush 35 and brush 37 to the terminal 57. The above operational description assumes that brush 35 is connected to the brush 37 via the conducting surface 36′ and common conducting surface 36. When the brush 34 is connected to the brush 37 via the common conducting surface 36, and terminal 57 goes positive with respect to the terminal 56, current will flow from terminal 57 through the capacitor 65 and adjustable resistor 61 to charge the capacitor 60 to the breakdown voltage of the avalanche device 62. When the avalanche device 62 breaks down to turn on the silicon controlled rectifier 59, current can flow through the field coil 20 to the terminal 56.

By varying the adjustable resistor 61, the time constants for charging the capacitors 64 and 60 are changed and, therefore, the time constant for triggering the silicon controlled rectifiers 58 and 59 are changed. By varying abovementioned time constants, the synchronous speed of the motor being controlled can be varied.

A motor has been constructed in accordance with the present invention which is approximately 2″ in diameter and ¾″ thick which has an output torque of 16–20 in.-oz. at 1200 r.p.m. The constructed motor has three pair of rotor poles and three pair of stator poles. The 16–20 in.-oz. torque at 1200 r.p.m. was obtained with an input of 115 volts, 60 cycles per second applied to the field coil which had 3125 turns of #36 AWG insulated wire.

The motor of the present invention, as hereinbefore described, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A motor comprising: a rotor; a plurality of stator poles circumscribing said rotor; a field coil for establishing the polarity of said stator poles; commutator means for controlling the direction of current flow through said field coil, said commutator means comprising, first and second brushes, a third brush, a rotating commutator element for alternately connecting said first and second brushes to said third brush, said rotating commutator element being mounted on a common shaft with said rotor, means for connecting said third brush to a first side of an alternating current power source, first and second unidirectional semiconductor devices, each of said devices having a cathode electrode and anode electrode, means for connecting said anode electrode of said first semiconductor device to said first brush and said cathode electrode of said first semiconductor device to a first side of said field coil, means for connecting said cathode electrode of said second semiconductor device to said second brush and said anode electrode of said second semiconductor device to said first side of said field coil; and means for connecting a second side of said field coil to a second side of said alternating current power source.

2. A motor as in claim 1 wherein said rotor is a permanent magnet rotor having a predetermined number of alternately spaced north and south magnetic poles.

3. A motor as in claim 1 wherein said field coil is a spool wound coil annularly disposed about said stator poles.

4. A motor as in claim 1 wherein there is a cylindrically shaped housing for said motor, said housing having substantially flat ends and said stator poles are integrally formed out of said ends.

5. A motor as in claim 4 wherein there is a spool wound coil annularly disposed in the space between said stator poles and the outside walls of said housing.

6. A motor as in claim 1 wherein said rotating commutator element has a common conducting surface with three equally and radially spaced integrally formed conducting surfaces extending therefrom, said first and second brushes being disposed on opposite sides of said rotating commutator element so as to alternately contact said conducting surfaces extending from said common conducting surfaces, said third brush being in contact with said common conducting surface.

7. A motor as in claim 1 wherein said commutator means includes timing circuit means for rendering said first and second unidirectional semiconductor devices conductive at a predetermined periodicity.

8. A motor as in claim 1 wherein said commutator means includes an adjustable circuit means for varying the synchronous speed of said motor.

9. A motor as in claim 1 wherein said commutator means includes a variable timing circuit means for determining the synchronous speed of said motor, said variable timing circuit means including means for rendering said first and second unidirectional semiconductor devices conductive at a predetermined periodicity.

10. A motor as in claim 1 wherein there are means for connecting said field coil directly across said alternating current power source when said rotor reaches a predetermined synchronous speed.

11. A motor as in claim 1 wherein there are means responsive to the speed of said rotor so as to connect said field coil directly across said alternating current power source when said rotor reaches a predetermined synchronous speed.

12. A motor comprising: a permanent magnet rotor having a predetermined number of alternating north and south magnetic poles equally and radially spaced; said rotor being fixedly mounted on a shaft rotatably supported in said motor; a stator having a predetermined number of pole pairs equally and radially spaced so as to define a uniform air gap between said stator pole pairs and said magnetic poles of said rotor; a field coil disposed in relation to said stator pole pairs so as to establish the polarity thereof; commutator means for controlling the direction of current flow through said field coil, said commutator means comprising, first and second brushes, a third brush, a rotating commutator element for alternately connecting said first and second brushes to said third brush, said rotating commutator element being mounted on said shaft, said third brush being connected to a first side of an alternating current power source, a first unidirectional semiconductor device having an anode connected to said first brush and a cathode connected to a first side of said field coil, and a second unidirectional semiconductor device having a cathode connected to said second brush and an anode connected to said first side of said field coil; and means for connecting a second side of said field coil to a second side of said alternating current power source.

13. A motor as in claim 12 wherein there are copper rings for shading a predetermined number of said stator pole pairs, thereby determining a rotational direction for said motor.

14. A motor as in claim 12 wherein there is a cylindrically shaped housing for said motor, said housing having substantially flat ends with said stator pole pairs integrally formed out of said ends.

15. A motor as in claim 14 wherein there are additional stator poles attached to said ends and shaping rings disposed between said additional stator poles and said ends.

16. A motor as in claim 12 wherein said rotating commutator element has a common conducting surface with three equally and radially spaced integrally formed conducting surfaces extending therefrom, said first and second brushes being disposed on opposite sides of said rotating commutator element so as to alternately contact said conductingg surfaces extending from said common conducting surface, said third brush being in contact with said common conducting surface.

17. A motor as in claim 12 wherein there are means responsive to the speed of said rotor so as to connect said field coil directly across said alternating current power suroce when said rotor reaches a predetermined synchronous speed.

18. A motor as in claim 12 wherein there are means for connecting said field coil directly across said alternating current power source when said rotor reaches a predetermined synchronous speed.

19. A motor comprising: a permanent magnet rotor having a predetermined number of alternating north and south magnetic poles equally and radially spaced about a periphery thereof, said rotor being fixedly mounted on a shaft rotatably supported in said motor; a stator having a predetermined number of pole pairs equally and radially spaced in a circle so as to circumscribe said magnetic poles of said rotor, said stator pole pairs being spaced from said magnetic poles of said rotor so as to define an air gap therebetween; a field coil for establishing the polarity of said stator pole pairs, said field coil being annularly disposed about said stator pole pairs; commutator means comprising, a rotating commutator element having a common conducting surface and three equally and radially spaced integrally formed conducting surfaces extending therefrom, said rotating commutator element being mounted on said shaft, first and second brushes for alternately contacting one of said conducting surfaces extending from said common conducting surface, said first and second brushes being disposed on opposite sides of said rotating commutator element, a third brush for continuously contacting said common conducting surface, said third brush being connected to a first side of an alternating current power source, a first unidirectional semiconductor device having an anode connected to said first brush and a cathode connected to a first side of said field coil, and a second unidirectional semiconductor device having a cathode connected to said second brush and an anode connected to said first side of said field coil; and means for connecting a second side of said field coil to a second side of said alternating current power source.

20. A motor as in claim 19 wherein said commutator means includes an adjustable circuit means for varying the synchronous speed of said motor.

21. A motor as in claim 19 wherein said commutator means includes a variable timing circuit means for determining the synchronous speed of said motor, said variable timing circuit means including means for rendering said first and second unidirectional semiconductor devices conductive at a predetermined periodicity.

References Cited
UNITED STATES PATENTS

| | | | |
|---|---|---|---|
| 3,200,315 | 8/1965 | Thompson | 318—138 |
| 3,264,538 | 8/1966 | Brailsford | 318—138 |
| 3,350,615 | 10/1967 | Linder | 318—138 |

ORIS L. RADER, *Primary Examiner.*

G. Z. RUBINSON, *Assistant Examiner.*